United States Patent
Elliott (10) Patent No.: US 7,277,955 B2
(45) Date of Patent: Oct. 2, 2007

(54) STREAMING CONTENT

(75) Inventor: Brig Barnum Elliott, Arlington, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 567 days.

(21) Appl. No.: 09/748,057

(22) Filed: Dec. 22, 2000

(65) Prior Publication Data

US 2002/0083184 A1 Jun. 27, 2002

(51) Int. Cl.
G06F 15/16 (2006.01)
G06F 13/00 (2006.01)

(52) U.S. Cl. .......... 709/231; 709/218; 709/232; 725/47

(58) Field of Classification Search .......... 709/203, 709/217–219, 226, 227, 229–232, 238, 245, 709/246; 725/47
See application file for complete search history.

(56) References Cited

U.S. PATENT DOCUMENTS

| 4,405,241 | A | | 9/1983 | Aihara et al. | |
|---|---|---|---|---|---|
| 4,452,119 | A | | 6/1984 | Tanimoto | |
| 5,613,192 | A | | 3/1997 | Ikami et al. | |
| 5,708,627 | A | | 1/1998 | Gormley | |
| 5,797,752 | A | | 8/1998 | Umezawa | |
| 5,953,005 | A | | 9/1999 | Liu | |
| 6,069,310 | A | | 5/2000 | James | |
| 6,226,672 | B1 | * | 5/2001 | DeMartin et al. | 709/219 |
| 6,229,430 | B1 | | 5/2001 | Smith-Dewey | |
| 6,434,621 | B1 | * | 8/2002 | Pezzillo et al. | 709/231 |
| 6,484,156 | B1 | * | 11/2002 | Gupta et al. | 707/1 |
| 6,526,411 | B1 | * | 2/2003 | Ward | 707/102 |
| 6,587,127 | B1 | * | 7/2003 | Leeke et al. | 345/765 |
| 6,606,660 | B1 | * | 8/2003 | Bowman-Amuah | 709/227 |
| 6,658,485 | B1 | * | 12/2003 | Baber et al. | 719/314 |
| 6,662,231 | B1 | * | 12/2003 | Drosset et al. | 709/229 |
| 6,671,732 | B1 | * | 12/2003 | Weiner | 709/231 |
| 6,766,357 | B1 | * | 7/2004 | Fandozzi | 709/213 |
| 6,772,209 | B1 | * | 8/2004 | Chernock et al. | 709/225 |
| 2002/0032019 | A1 | * | 3/2002 | Marks et al. | 455/414 |

OTHER PUBLICATIONS

Wanjiun Liao and Victor O. K. Li, "The Split and Merge (SAM) Protocol for Interactive Video-on-Demand Systems", 1997.*
Internet content from www.audiobasket.com, downloaded Jun. 12, 2000, publication date unknown.

* cited by examiner

Primary Examiner—Krisna Lim
Assistant Examiner—Yasin Barqadle (57) ABSTRACT

The disclosure describes techniques that enable a server to receive content submitted for delivery to a user and stream the submitted content to a receiver associated with the user. Such content may streamed along with generic, shared content.

To handle streaming of received content, the server may modify a play list associated with a user to include the submitted content. The timing of content streaming may be affected by play scheduling information specified by a submitter such as a specific streaming time or a number of times to stream the content.

28 Claims, 8 Drawing Sheets

| PLAY LIST FOR RECEIVER 104 | | | |
|---|---|---|---|
| CONTENT | LENGTH | DELETE | REPEAT |
| /users/104/generic/moonriver.wav | 350 s | False | 5 |
| /users/104/submitted/reminder05.wav | 203s | True | 1 |
| /users/104/generic/beethoven5.wav | 804s | False | 1 |
| 126 | 128 | 130 | 132 |

STREAMING CONTENT

REFERENCE TO RELATED APPLICATIONS

This application relates to U.S. patent application Ser. No. 09/748047 entitled NETWORK SUPPLIED SELECTABLE SOUND- DATA FOR TIME IDENTIFICATION filed Dec. 22, 2000.

BACKGROUND OF THE INVENTION

1. Field of the Invention

The invention relates to streaming content over a network.

2. Description of Related Art

The Internet and other networks provide access to increasing volumes of multimedia content such as songs, advertisements, video, and so forth. Network connections, however, are often too slow to permit quick downloading of large multimedia files.

One technique for delivering multimedia content over a network is known as "streaming." Streaming involves transmitting data such that a network receiver, such as a personal computer running a web-browser, can start presenting content to a user before transmission of the entire data file completes. The receiver typically buffers received data that arrives ahead of time to avoid "starving" if the transmission rate slows. Buffering can help ensure a smooth presentation of transmitted data.

Some network sites provide "Internet Radio" and "Internet TV" Stations. Some sites offer a limited ability to personalize the content streamed to a user. For example, some sites enable a user to specify preferences of a particular genre of music or of a favorite artist. The sites use these preferences when composing a play list for the user from the large library of content stored at the site.

The inventor of the present invention realized that the content stream could be personalized even more by allowing submission of content from others for delivery to a particular user. The inventor also realized that such an approach can, in varying degrees, decouple the task of providing content from the task of streaming content to receivers.

SUMMARY OF THE INVENTION

The disclosure describes techniques that enable a server to receive content submitted for delivery to a user and stream the submitted content to a receiver associated with the user. Such content may be streamed along with generic, shared content such as popular music or news items. This can, for example, allow a subscriber's voice mail messages to be played out over their personalized radio station, interposed between songs on the radio. As another example, this invention allows reminders of upcoming meetings or other scheduled events to be interposed into personalized radio or TV stations. As described herein, third parties other than the generic content provider and the user can manipulate the content stream.

To handle streaming of received content, the server may modify a play list associated with a user to include a reference to the submitted content. The timing of content streaming may be affected by play scheduling information specified by a submitter such as a specific streaming time or a number of times to stream the content.

In general, in one aspect, the invention features a method for use by a network server that streams content over a network to a network receiver. The method includes receiving information from a remote network node that includes content and identification of a user. The method further includes causing streaming of the content to a network receiver associated with the identified user.

Embodiments may include one or more of the following features. The content may include audio data and/or video data. For example, the audio data may be a voice mail message. Similarly, the content may be a reminder message. Causing streaming of the content may include streaming the content to the network receiver associated with the identified user. The method may further include modifying a play list associated with the identified user to include a reference to the identified content. The play list can identify generic, shared content in addition to the received content. The method may further include determining whether a submitter of the content is authorized to submit content.

The method may further include receiving play scheduling information for the content and modifying the play list based on the received play scheduling information. Receiving play scheduling information can include receiving a number of times to stream the content, a specified time to stream the content, a priority for streaming the content. The method may include terminating streaming of currently streaming content and initiating streaming of the identified content. The method may further include providing user interface instructions for submitting content and transmitting the user interface instructions to a remote network node.

In general, in another aspect, the invention features a system for use by a network server that streams content over a network to a network receiver. The system includes play lists associated with different respective users that identify content for streaming delivery to network receivers associated with the respective users; instructions for causing a processor to receive information from a remote network node that includes content and identification of a user of the different respective users; and instructions for causing a processor to modify a play list associated with the identified user to include a reference to the content.

Embodiments may include one or more of the following features. The system may include a stream generator for streaming content to the identified user based on the play list associated with the user. The system may further include instructions for causing a processor to transmit user interface instructions to a remote network node. The user interface receives identification of content designated by a content submitter and transmits the identification to the network server.

In general, in another aspect, the invention features a computer program, disposed on a computer readable medium, for use by a network server that streams content over a network to a network receiver. The computer program includes instructions for causing the server processor to receive information from a remote network node that includes content and identification of a specific user and instructions for causing the server processor to modify a play list associated with the identified user to include a reference to the content.

In general, in another aspect, the invention features a graphical user interface for receiving input from a user. The graphical user interface includes instructions for causing a processor to receive input identifying content, receive input identifying a user to receive streaming delivery of the identified content, and transmit the received input identifying content and the received input identifying the user to a network server.

Embodiments may include one or more of the following. The instructions may cause a processor to receive user input identifying play scheduling information for the content. The graphical user interface may be defined by markup language instructions.

Advantages will become apparent in view of the following description, including the figures and the claims.

DETAILED DESCRIPTION OF THE PREFERRED EMBODIMENT(S)

Figure 1:
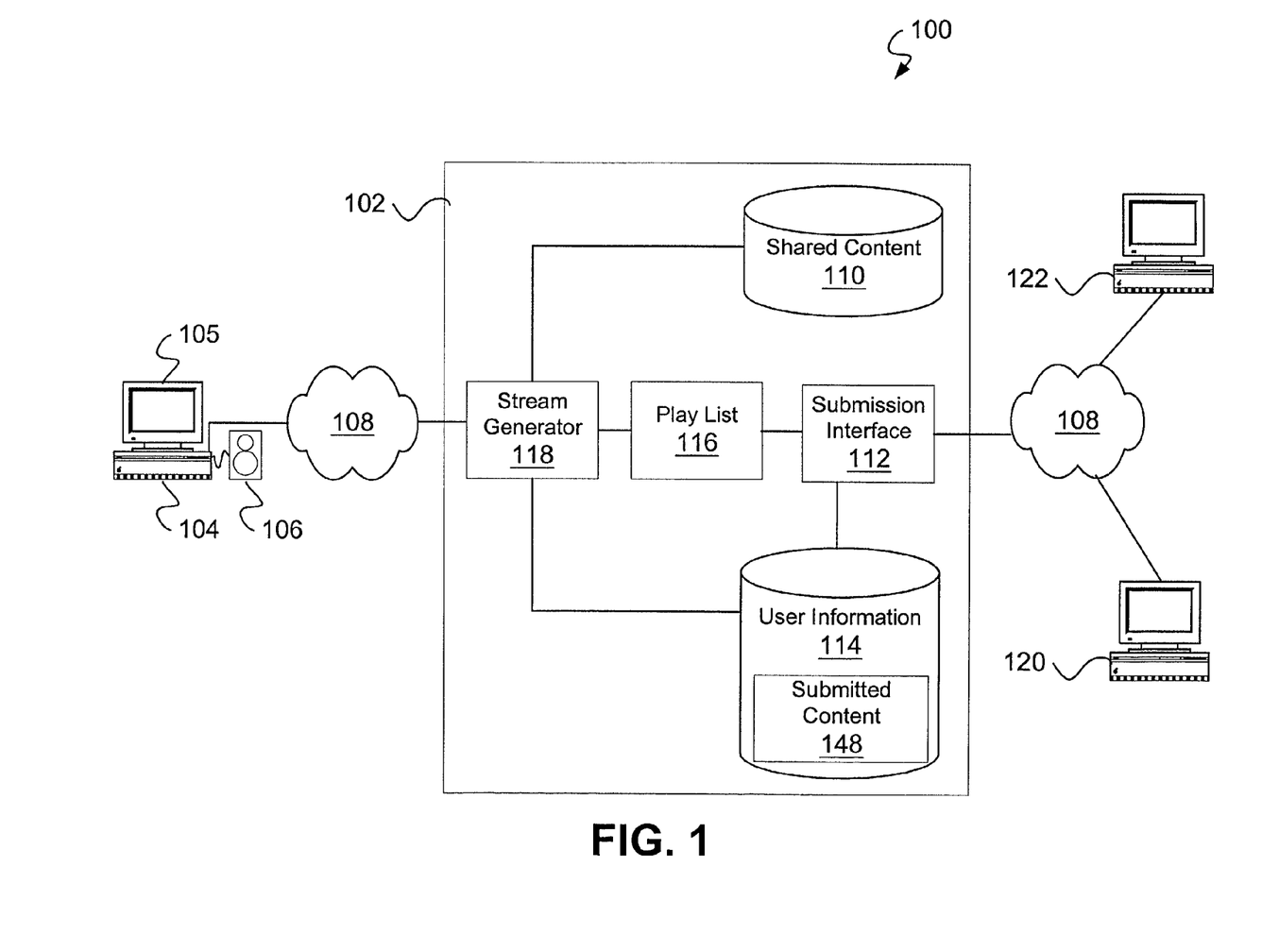
FIG. 1 is a diagram of a system that streams content to a network receiver.

FIG. 1 shows a system 100 for streaming content 110, 148 from a network server 102 to a network receiver 104 over a computer network 108 such as the Internet. The content 110, 148 may include encoded audio and/or video data for presentation to a user by the user's receiver 104. While the network receiver 104 shown is a personal computer having a display 105 and speaker 106, other receivers, such as network appliances, may present the streamed content 110, 148 to a user.

For simplicity, FIG. 1 shows the server 102 streaming content 110, 148 to a single receiver 104, however, server 102 typically handles streaming for a number of different receivers 104 associated with different users. Different users may receive different content 110, 148. For example, the server 102 may stream rock music to one user's receiver 104, and stream soul music to another's.

To coordinate streaming of different content 110, 148 to different users, the server 102 can store, or access, user play lists 116 that identify content 110, 148 that server 102 streams to a particular user's receiver 104. For example, the play list 116 may be a simple queue of content 110, 148 to be streamed to a user's receiver 104. A stream generator 118 accesses the play list 116 to identify content to stream to a particular user's receiver.

As shown, the server 102 stores, or otherwise accesses, generic, shared content 110. Generic, shared content 110 can include commercial songs, advertisements, news broadcasts, and so forth. Generic, shared content 110 may be freely included by the server 102 in different users' play lists subject to user preferences, parental controls, and so forth.

In addition to generic, shared content 110, the server 102 may store content 148 received from remote network nodes 120, 122 over the network 108. For example, a remote network node 120, 122 may transmit information to a submission interface 112 provided by the server 102 for handling incoming content submissions. The information submitted by the remote network nodes 120, 122 includes content for streaming delivery to an identified user. The submitted content 148 may be stored along with other user information 114 such as user preferences, security information, and so forth.

Upon receiving a submission of content from a remote network node 120, 122, the submission interface 112 may store the content 148 and modify a play list 116 of the identified user to include a reference to the content. A user's play list 116 can, thus, include references to both generic, shared content 110 not submitted for delivery to a specific user and content 148 specifically submitted for delivery to the user. The user can, thus, experience what amounts to a personalized network radio or TV station where personal messages such as reminders, voice mail messages, and messages from friends are intermixed with generic, shared content such as popular songs or news updates. For example, a user may hear a song from a favorite musician, an audio message submitted by a friend to server 102 for delivery to the user, followed by an audio news headline and an audio message featuring a synthesized voice stating "Meeting in five minutes." The techniques have many other applications. For example, a child may record a violin performance on a home computer and submit the recording for delivery to a traveling parent.

The ability to modify a user's play list 116 to include a reference to content 148 submitted for delivery to a designated user offers a number of potential benefits. For example, the task of acquiring and selecting content for inclusion in a user's play list 116 may be, at least partially, decoupled from the task of streaming content to the user's receiver 104.

Figure 2:
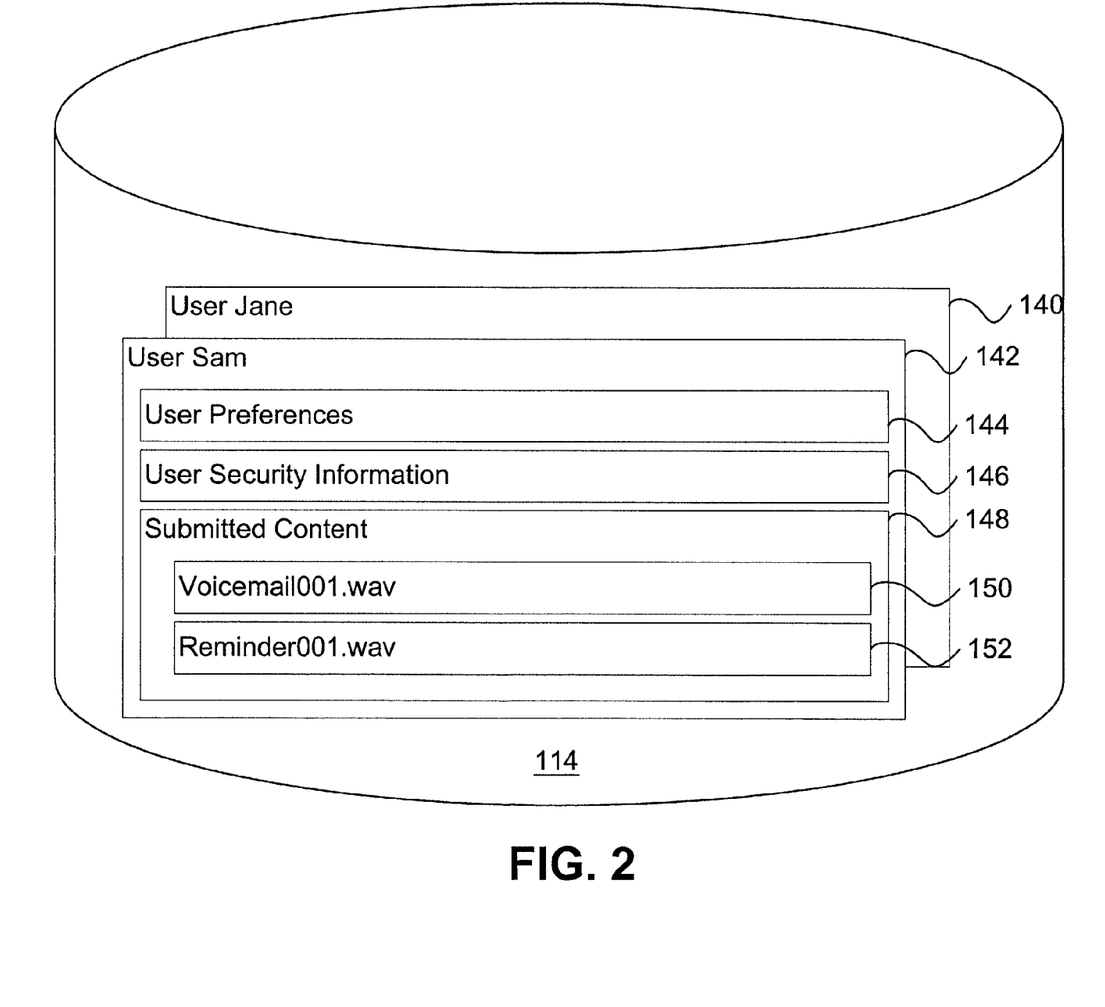
FIG. 2 is a diagram of user information accessed by the server.

FIG. 2 shows an example of user information 114 a server may store or otherwise access. For each user 140, 142, the information 114 may include user preferences 144 such as a preferred genre of music or favorite news source. The information 114 for each user may also include user 140, 142 security information 146. The security information 146 can restrict content submission to authorized entities. For example, the security information 146 can include a list of other users authorized to submit content for delivery to the user and/or a password that other users must provide to successfully submit content.

As shown, a user's information 142 also includes content 148 submitted for delivery to the user. For example, in FIG. 2, a user has received a voice mail message audio file 150 and a reminder audio file 152 for delivery. Such files 150, 152 may be deleted by the server after the server streams the files 150, 152 to the user's receiver. This approach can reduce server storage requirements. A stream generator can access the content file 150, 152 when the user's play list identifies the file 150, 152 as the next to stream to the user's receiver.

Figure 3:
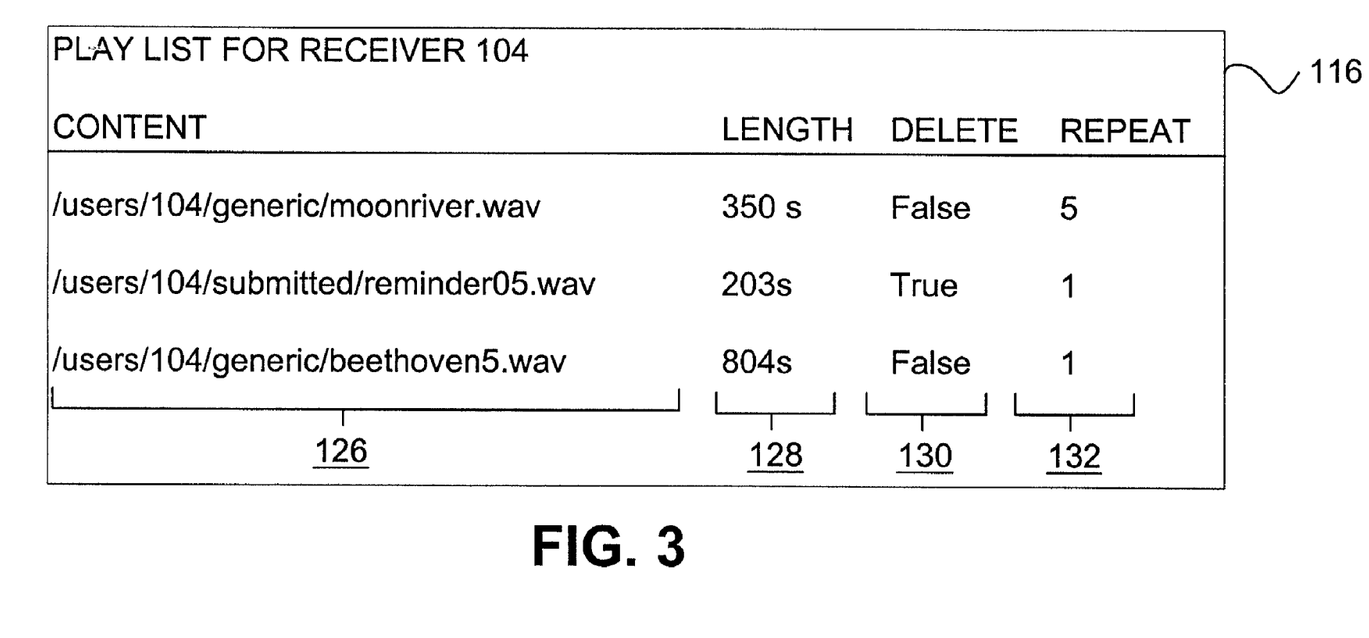
FIG. 3 is a diagram of a play list identifying content for streaming delivery to a user's receiver.

FIG. 3 shows an example of a play list 116 for a particular user's receiver. As shown the play list 116 includes a reference to content 126 that the server will stream to the user's receiver. Such a reference may be a URI (Universal Resource Indicator), directory specification, or other indication of where the content 126 is stored. The play list 116 may also, potentially, include the content's 126 estimated duration 128, an indication 130 of whether to delete the content file 126 after streaming, and an indication 132 of how many times to stream the file 126 to the user's receiver.

The play list 116 depicted is a simple queue. That is, a stream generator accessing the play list 116 will sequentially stream "moonriver.wav", then "reminder05.wav", and finally "beethoven5.wav". Play lists 116, however, can take a variety of different forms. For example, instead of an ordered queue of content 126, the play list 116 may feature an unordered collection of content 126. Such a play list 116 may feature different priority values for different content 126 that enables the stream generator to select the next content to stream. For example, a voice mail message having a priority of HIGH will be selected for streaming before a song having a priority of LOW. Regardless of the play list 116 implementation, the play list 116 may include both generic, shared content and content submitted for delivery to the user.

Figure 4:
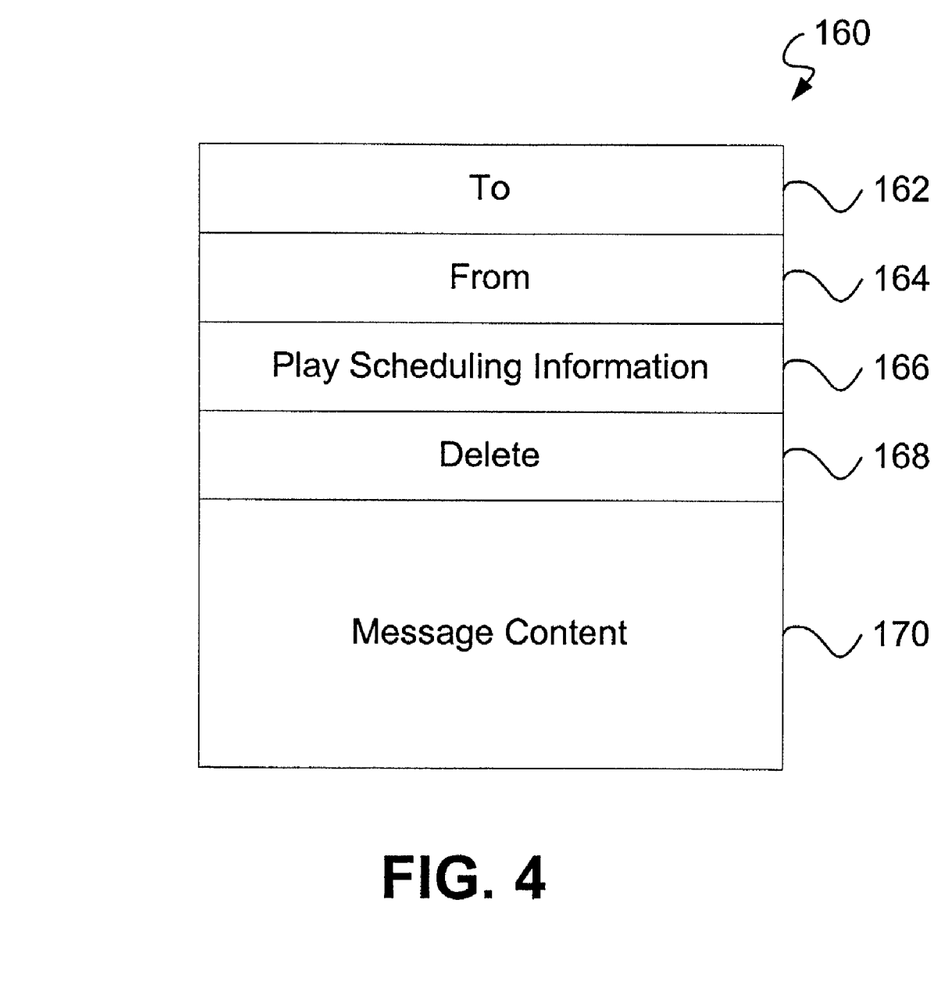
FIG. 4 is a diagram of information received from a remote network node that identifies content for delivery to a user.

FIG. 4 shows an example of a format of a message 160 a remote network node may use to submit content to a server for delivery to a user's receiver. The message 160 may be encoded as XML (Extensible Markup Language), included in an HTTP (HyperText Transfer Protocol) message, and so forth. As shown, the message 160 includes identification of a specific user 162 that should receive the content 170 identified in the message 160. The message 160 may include the actual content 170 data or a reference to the data for subsequent retrieval by the server.

The message 160 may also include an indication 164 of an entity submitting the content 170. The server may use the indication 164 to determine whether the entity is authorized to submit content for the user, whether a user has requested priority streaming for content 170 received from the entity, and so forth.

As shown, the message 160 can also include play scheduling information 166. Play scheduling information 166 can indicate where the content should be included in a play list. For example, the play scheduling information 166 can indicate a time the user's receiver should present the submitted content, how often the server should stream the content to the user's receiver, and so forth. The message 160 depicted also includes a delete flag 168 indicating that the server should delete the content after streaming the content a final time.

As those of skill in the art will appreciate, the message 160 format illustrated in FIG. 4 is merely an example. Other data structures of different sizes, data types, and fields may encode content submission.

Figure 5:
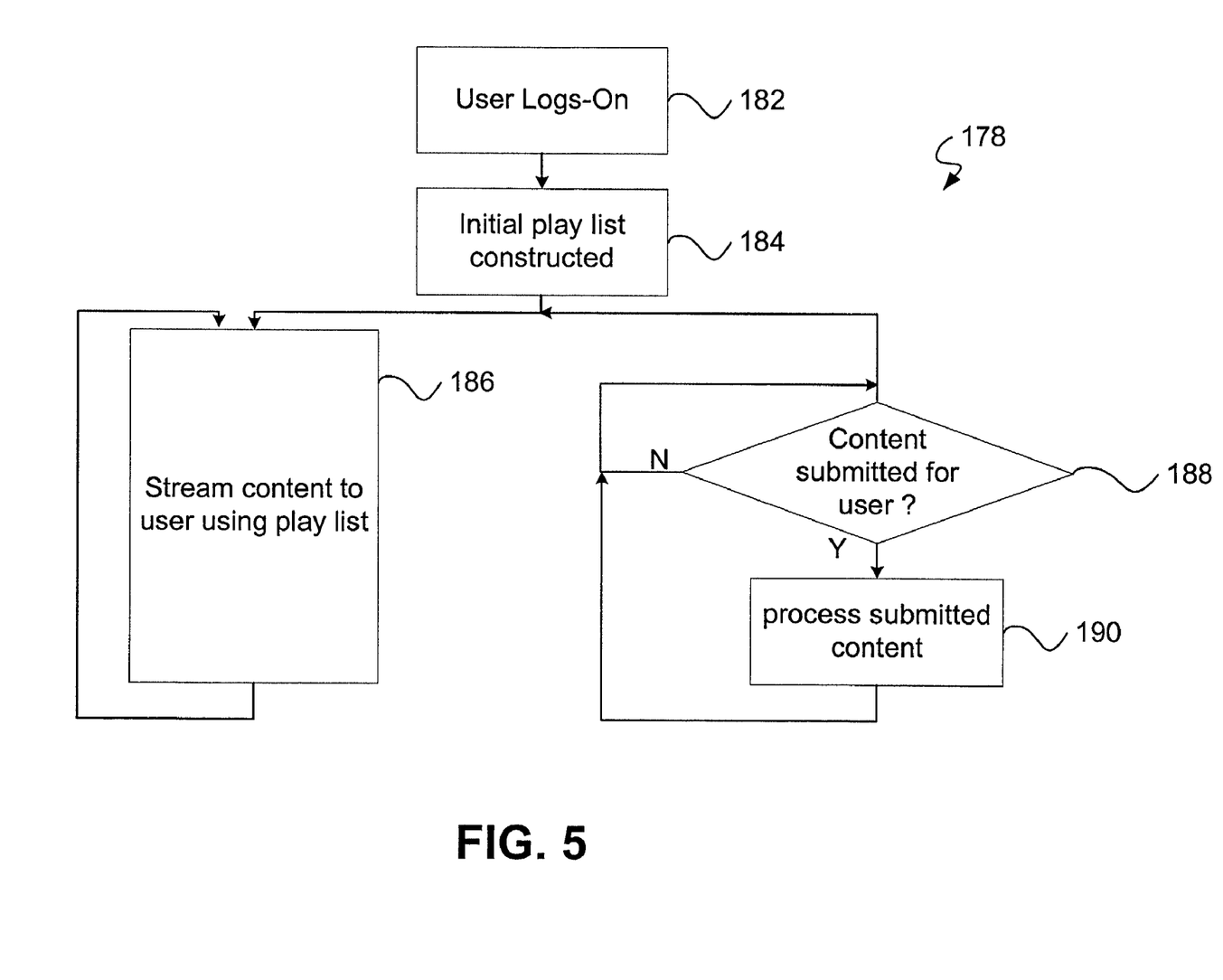
FIGS. 5 and 6 are flow-charts of processes for streaming content received from remote network nodes for delivery to a user.

FIG. 5 shows a flow-chart of a process 178 for streaming content to a user's receiver that includes submitted content. The process 178 begins when a user logs-on (step 182). For example, a user may direct a web-browser to a login URI provided by the server and enter a username and password into an HTML form. The login enables the server to identify an IP (Internet Protocol) address of the user's receiver. Alternatively, the IP address may be pre-configured by the user. After the user logs-on (step 182), the server constructs (step 184) an initial play list. For example, the server may use the user's preferences to identify generic, shared content for delivery. The server may also include any content submitted for delivery to the user that has not been deleted.

After initial construction (step 184) of the user's play list, the server can being streaming (step 186) content identified by the user's play list to the user's receiver. For example, the server can initiate RealAudio™, RealVideo™, or RTP (Real Time Protocol) streaming communication with the user's receiver. Concurrently, the server can wait (step 188) for newly received content submitted for delivery to the user. Upon receiving such content, the server can process (step 190) the submitted content for potential inclusion in the user's play list.

Figure 6:
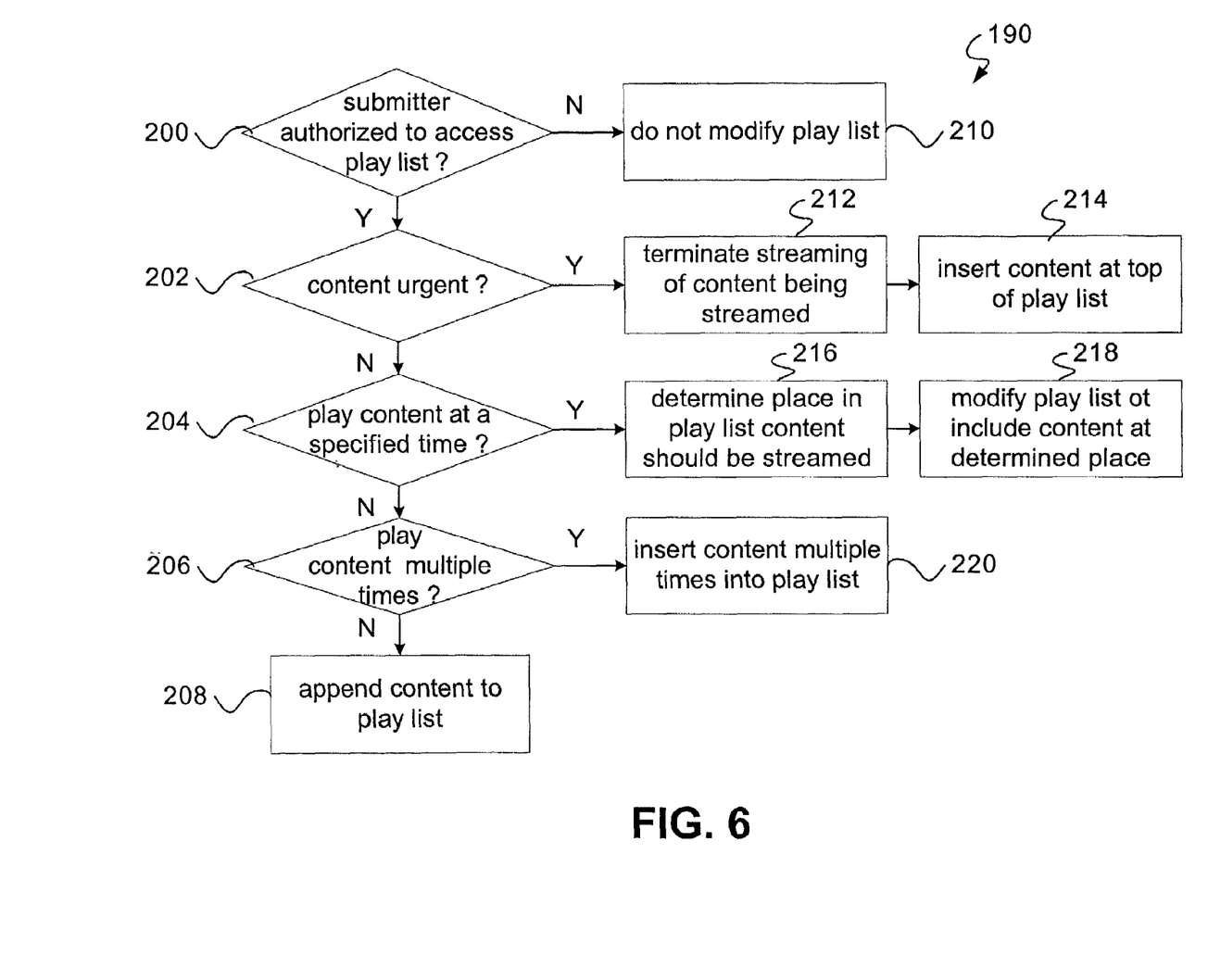

FIG. 6 shows a flow-chart of a process 190 for processing content submitted for delivery to a user. As shown, the process 190 may perform a security check (step 200) to ensure that a user has authorized a particular entity to submit content. If the security check (step 200) fails, the process does not modify the user's play list (step 210) to include a reference to the content.

The process 190 may also determine (step 202) if the submitted content should be played immediately. If so, the server may terminate (step 212) streaming of the content currently being streamed and insert (step 214) a reference to the submitted content at the top of the play list for immediate transmission to the user's receiver.

The submitted content's play scheduling information may also indicate a specific absolute (e.g., "12:00 PM") or offset (e.g., "5 minutes") time the user's receiver should receive the content. When the process 190 identifies (step 204) such play scheduling information, the process 190 can determine (step 216) where in the play list a reference to the content should be inserted. For example, the process 190 may use the estimated play lengths of content already in the play list and modify (step 218) the play list accordingly. In some cases, due to the play lengths of content already on the play list, the play list may be modified such that the user's receiver does not receive the content until slightly before or after a specified time. Based on user preferences, however, the play list may be modified to accommodate streaming of the submitted content at the specified time, though the process may be forced to include a calculated amount of dead air time to do so.

The play scheduling information may also indicate that submitted content should be streamed to a user's receiver a specified number of times. When the process 190 identifies (step 206) such play scheduling information, the process 190 can modify (step 220) the user's play list to include references to the submitted content a multiple number of times. Alternatively, the "repeated play" feature may be implemented by the server after streaming the content by reinserting a reference to the content into the play list and decrementing a running counter indicating the number of remaining times the content should be streamed.

For content not specifying play scheduling information, the process 190 can modify (step 208) the user's play list by adding identification of the content, for example, to the end of the list.

The process 190 shown in FIG. 6 may require coordination of access to a user's play list. For example, a stream generator may open the play list to identify the next content to stream to a user when the server's submission interface attempts to open the play to insert a reference to newly received content. To facilitate coordination, attempts to access to the play list may specify SHARED-READ or EXCLUSIVE-READ-WRITE protection. A procedure attempting to access the play list already opened by other procedure for EXCLUSIVE-READ-WRITE may periodically reattempt access until successful.

Figure 7:
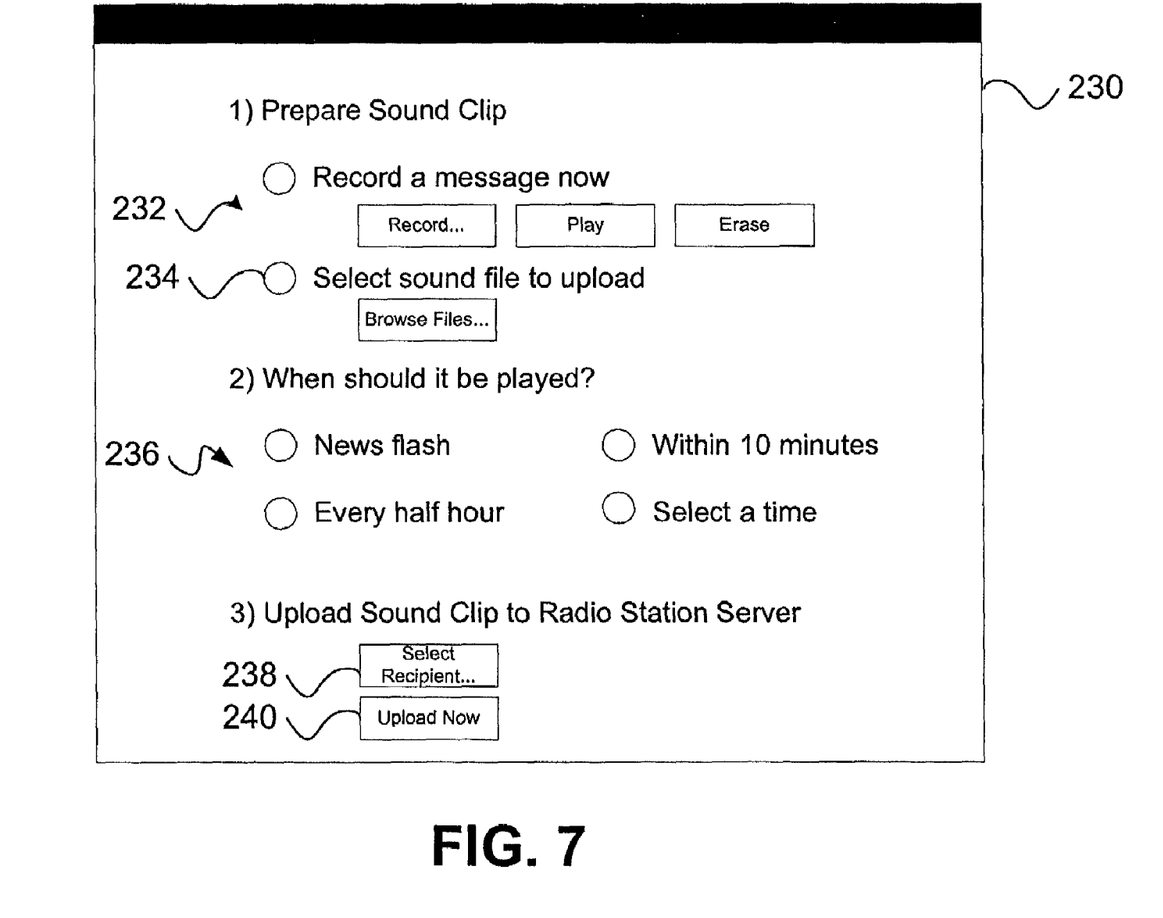
FIG. 7 is a screenshot of a graphical user interface for identifying content and a user to receive the identified content.

FIG. 7 shows a graphical user interface 230 that the server may provide to remote network nodes for submitting content for delivery to a user. The graphical user interface 230 may be defined by structured markup language instructions such HTML, XML, or other SGML (Structured General Markup Language) implementation. Such instructions may be transmitted over a network for execution/interpretation by the remote network node's web-browser, for example, in response to an HTTP request.

As shown, the interface 230 includes a "Select Recipient" control 238 that permits identification of a user to receive submitted content. The interface 230 also includes controls 236 that enable specification of play scheduling information such as a specific time to stream the content or interval at which to repeat streaming. The interface 230 also includes a control 234 that enables selection of content for submission. Alternatively, a submitter can use tape-recorder like controls 232 to record content for delivery to the identified user. The graphical user interface 230 can transmit a message, such as the message shown in FIG. 4, to the server upon selection of an "Upload Now" control 240.

While FIG. 7 shows an example of a graphical user interface for submitting content for delivery to a user, the submission process does not require a user interface. For example, a remote network node may implement a system that automatically submits content for delivery to a user. For instance, a remote network node may receive voice mail messages for one or more users. Such a remote network node may automatically submit the voice mail messages to the server for inclusion in a particular user's play list upon receiving a new message.

Figure 8:
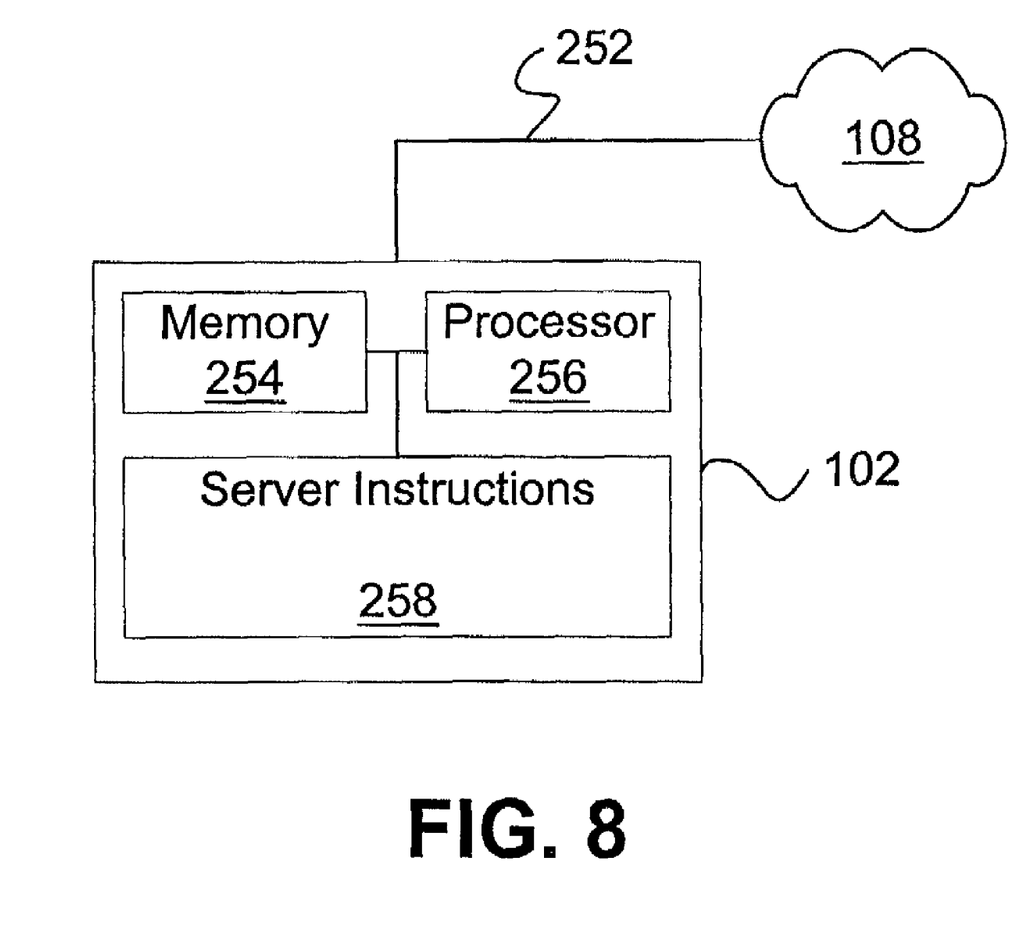
FIG. 8 is a diagram of a computer suitable for executing server instructions.

FIG. 8 shows an example of a server 102 configured to stream content submitted for delivery to a particular user. As shown, the server 102 includes a network connection 252, volatile and/or non-volatile memory 254, and one or more processors 256. The server 102 also stores, or otherwise accesses, server instructions 258 that implement techniques described above. The server instructions 258 may be transferred to memory 254 for execution by the processor(s).

The techniques described herein are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices.

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method for use by a network server that streams content over a network to a network receiver, the method comprising:
providing remote network node interface instructions for submitting remote network node content;
transmitting the remote network node interface instructions to a remote network node that is independent of a user associated with a play list;
receiving a request from the remote network node via the transmitted interface instructions to modify the play list, the request including remote network node content information and identification information of the user, the play list being associated with the user identified by the identification information;
determining whether a priority relative to each other item on the playlist is associated with the remote network node content;
modifying the play list associated with the user to include a reference to the remote network node content and, if the priority is determined, modifying the play list based on the determined priority including, based on the determined priority, terminating streaming of currently streaming content and initiating streaming of the remote network node content, the play list identifying content for streaming delivery to a network receiver associated with the identified user; and
causing streaming of the remote network node content to the network receiver associated with the identified user as part of the content for streaming delivery based on the modified play list.

2. The method of claim 1, wherein the remote network node content comprises at least one of audio data and video data.

3. The method of claim 2, wherein the audio data comprises a voice mail message.

4. The method of claim 2, wherein the remote network node content comprises a reminder.

5. The method of claim 1, wherein the play list identifies generic, shared content in addition to the remote network node content.

6. The method of claim 1, further comprising determining whether the remote network node is authorized by the user to submit content.

7. The method of claim 1, further comprising:
receiving play scheduling information for the content based on the interface instructions; and
modifying the play list based on the received play scheduling information.

8. The method of claim 7, wherein receiving play scheduling information comprises receiving a number of times to stream the remote network node content.

9. The method of claim 7, wherein receiving play scheduling information comprises receiving a specified time to stream the remote network node content.

10. The method of claim 1, wherein modifying the playlist comprises ordering an entirety of the playlist based upon relative priorities of each item of remote network node content.

11. The method of claim 1, wherein receiving play scheduling information comprises receiving an indication of whether to delete the remote network node content after streaming the remote network node content a predetermined number of times.

12. A system for use by a network server that streams a content over a network to a network receiver, the system comprising:
play lists associated with different respective users, the play lists identifying content for streaming delivery to network receivers associated with the respective users;
a processor configured to stream received content and determine whether a priority relative to each other item on the playlist is associated with the received content;
instructions for causing the processor to receive a request from a remote network node to modify at least one play list of the play lists, the request including received content and identification of one user of the different respective users, the one play list being associated with the one user, the remote network node being independent of the one user; and instructions for causing the processor to modify the one play list associated with the one user to include a reference to the received content and, if the priority is determined, to modify the one play list based on the determined priority including, based on the determined priority, terminating streaming of currently streaming content and initiating streaming of the received content.

13. The system of claim 12, further comprising a stream generator for streaming content to the one user based on the play list associated with the one user.

14. The system of claim 12, further comprising instructions for causing a processor to transmit interface instructions to the remote network node, the interface instructions for receiving identification of content designated by a content submitter and transmitting the identification to the network server.

15. The system of claim 12, wherein the processor is configured to modify the playlist by ordering an entirety of the playlist based upon relative priorities of each content item.

16. The system of claim 12, wherein the processor is configured to receive an indication of whether to delete the received content after streaming the received content a predetermined number of times.

17. A computer program, disposed on a computer readable medium, for use by a network server that streams content over a network to a network receiver, the computer program including instructions for causing the server processor to:
receive a request from a remote network node to modify a play list, the request including identified content and identification of a specific user at a node of the network other than the remote network node, the play list being associated with the specific user, the remote network node being independent of the specific user;
determine whether a priority relative to each other item on the playlist is associated with the identified content; and
modify the play list associated with the specific user to include a reference to the identified content and, if the priority is determined, to modify the play list based on the determined priority including, based on the determined priority, terminating streaming of currently streaming content and initiating streaming of the identified content, the play list identifying content for streaming delivery to a network receiver associated with the specific user.

18. The computer program of claim 17, further comprising instructions for causing the processor to stream the identified content to the network receiver associated with the specific user as part of the content for streaming delivery in accordance with the play list.

19. The computer program of claim 17, further comprising instructions for causing the processor to determine whether a submitter of the identified content is authorized by the specific user to submit content for the specific user.

20. The computer program of claim 17, further comprising instructions for causing the processor to:
receive play scheduling information for the identified content; and
modify the play list based on the received play scheduling information.

21. The computer program of claim 17, further comprising instructions for causing the processor to:
provide interface instructions for submitting content; and
transmit the interface instructions to the remote network node.

22. The computer program of claim 17, further including instructions for causing a processor to modify the playlist by ordering an entirety of the playlist based upon relative priorities of each content item.

23. The computer program of claim 17, further including instructions for causing a processor to receive an indication of whether to delete the remote network node content after streaming the identified content a predetermined number of times.

24. A computer program, disposed on a computer readable medium, for facilitating content streaming over a network to a network receiver, the computer program including instructions for causing a processor to:
receive input from the remote network node including remote network node content and user information for modifying a play list associated with the user;
receive input from the remote network node identifying the user to receive streaming delivery of the remote network node content, the user being a network node other than the remote network node;
determine whether a priority relative to each other item on the playlist is associated with the remote network node content;
form a request at the remote network node to modify the play list of the user to include the remote network node content and, if the priority is determined, to modify the play list based on the determined priority including, based on the determined priority, terminating streaming of currently streaming content and initiating streaming of the remote network node content; and
transmit the request, the input including the remote network node content and the input identifying the user to the network server.

25. The computer program of claim 24, further comprising instructions for causing a processor to:
receive input from the remote network node identifying play scheduling information for the remote network node content; and
transmit the input identifying play scheduling information to the network server.

26. The computer program of claim 24, wherein the computer program comprises instructions for a graphical interface defined by markup language instructions.

27. The computer program of claim 24, further including instructions for causing a processor to modify the playlist by ordering an entirety of the playlist based upon relative priorities of each item of remote network node content.

28. The computer program of claim 24, further including instructions for causing a processor to receive an indication of whether to delete the remote network node, content after streaming the remote network node content a predetermined number of times.

* * * * *